No. 632,165. Patented Aug. 29, 1899.
A. AMESS & M. A. POWLISON.
BICYCLE STAND AND LOCK.
(Application filed June 19, 1897.)
(No Model.) 2 Sheets—Sheet 1.
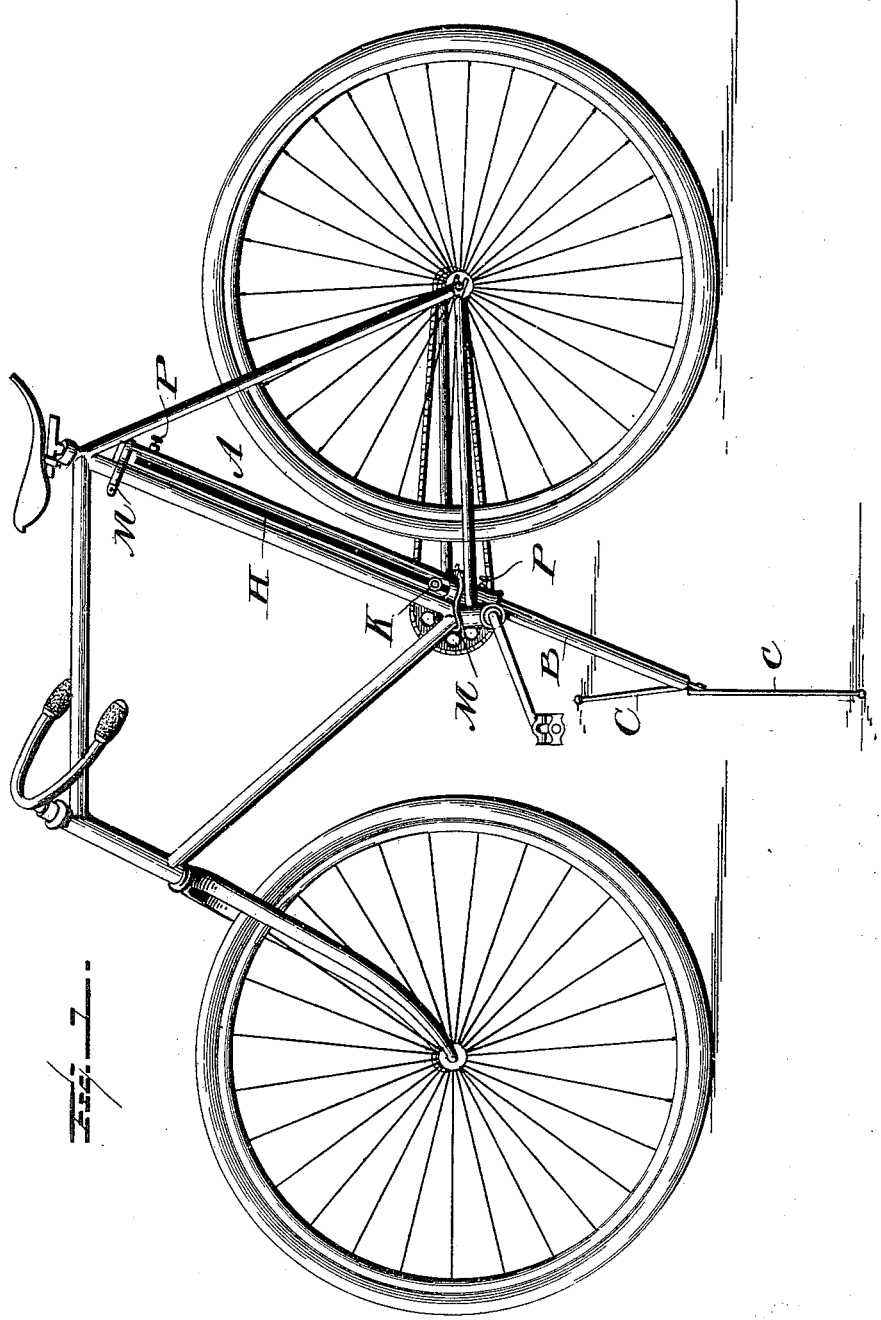
Witnesses
L. C. Hills
N. L. Bogan
Inventors.
Agness Amess.
Maude A. Powlison.
By A. C. Everts Co.
Attorneys

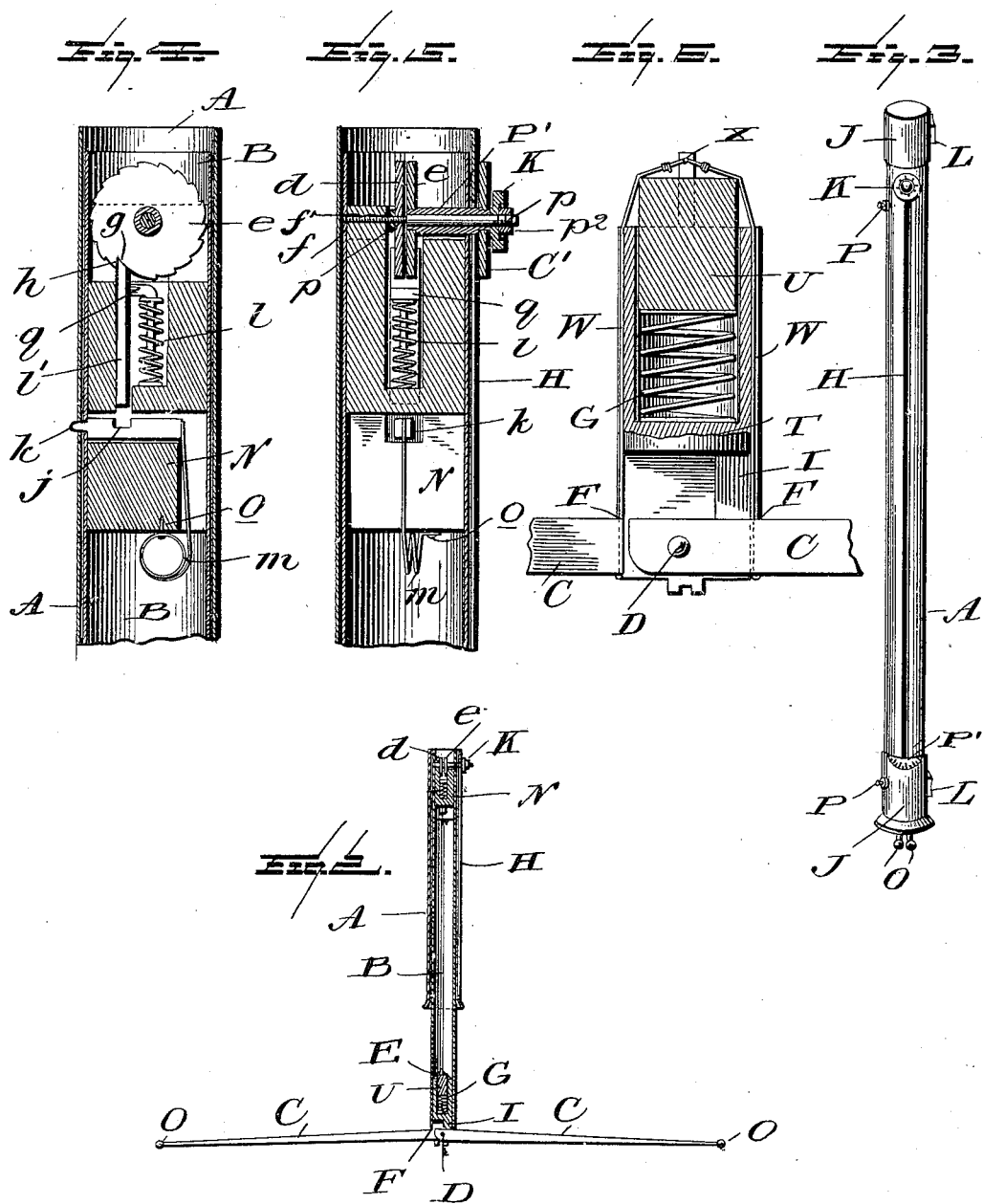

UNITED STATES PATENT OFFICE.

AGNESS AMESS AND MAUDE A. POWLISON, OF PERTH, NORTH DAKOTA.

BICYCLE STAND AND LOCK.

SPECIFICATION forming part of Letters Patent No. 632,165, dated August 29, 1899.

Application filed June 19, 1897. Serial No. 641,535. (No model.)

*To all whom it may concern:*

Be it known that we, AGNESS AMESS and MAUDE A. POWLISON, residing at Perth, in the county of Towner and State of North Dakota, have invented a new Telescope Bicycle-Stand and Combination-Lock, of which the following is a specification.

This invention relates to certain new and useful improvements in telescopic bicycle-stands and combination-locks.

The invention has for its object to construct a combination stand and lock for bicycles and like vehicles which will be simple in its construction, strong, durable, effectual in its operation, and comparatively inexpensive to manufacture.

The invention further aims to construct a telescopic stand which is adapted to be attached to the seat-post of the bicycle-frame and to provide novel means for holding the supporting-legs in the elevated position when not in use and for locking the same in the supporting position when the bicycle is not in use to support and lock the latter.

In describing the invention in detail reference is had to the accompanying drawings, forming a part of this specification, wherein like letters of reference will be employed for designating similar parts throughout the several views, in which—

Figure 1 is a perspective view of a bicycle with our improved stand and lock secured in position thereon and lowered in the position for supporting the bicycle and locking the same. Fig. 2 is a vertical sectional view of our improved stand and lock, showing the telescopic supporting-legs extended to the horizontal position. Fig. 3 is a perspective view of our improved stand and lock detached from the bicycle. Fig. 4 is a vertical sectional view of a portion of the stand. Fig. 5 is a like view taken at right angles to Fig. 3. Fig. 6 is a vertical sectional view of the spring-actuated plunger and its cylinder, showing a portion of the telescopic supporting-legs.

Referring now to the drawings by reference-letters, A indicates the outer tube or cylinder, which is adapted to telescopically receive the tube B and is provided in one side with a slot H, extending the greater portion of its length. This tube A is reinforced at its upper and lower ends by sleeves J J, each of which carry chairs or bearing-blocks L L, having concave faces to conform to the seat-post of the bicycle-frame. The sleeve J at the lower end of the tube is flared or bell-shaped at its lower end to assist in drawing the supporting-legs within the tube, as will be hereinafter described.

In the lower end of the tube B we firmly secure in any desirable manner a socket E, extending a short distance below the lower end of the tube B and is flattened to permit the pivotally securing thereto by means of a bolt D the supporting-legs C C. These supporting legs or braces C C are preferably provided on their outer ends with rubber tips O O to prevent slipping when in use and to obviate rattling of the legs when the bicycle is in use with the legs telescoped. The supporting-legs may be made tapering, as shown, although any desirable construction of legs may be employed.

The socket E reinforces the lower end of the tube B, in which it is fitted, and has arranged therein a coil-spring G, adapted to automatically spread the legs or braces C C as they are lowered to the supporting position. To accomplish this, we arrange in the upper end of the socket E a plunger U, having its lower end resting on the top of the coil-spring G and its upper end extending above the socket, with a pin X secured therein. To this pin X we secure the upper ends of a pair of spring-rods W W, extending downwardly in grooves provided therefor on opposite sides of the socket and having their lower ends connected at F to the pivoted ends of the braces C C. As the tube B is telescoped within the tube A the legs or braces C C are drawn inwardly toward each other, and as the tube B is lowered in the tube A the action of the spring G against the plunger U forces the latter upward and causes the spring-rods W to spread the legs or braces C C as they pass out of the tube into their supporting position. The outward movement of these legs or braces is limited by means of shoulders I, formed on the lower end of the socket E, adjacent to the flat portion to which the legs or braces are pivoted.

The stand is raised or lowered by means of the shaft upon which the tumblers of the permutation-lock are mounted and which slides in the slot H in the tube A.

The permutation-lock, by means of which the stand is locked when telescoped or in the supporting position, is arranged in a plug N, secured in the upper end of the tube B and provided with a central recess to permit the operation of the tumblers. This lock comprises a shaft $p$, passing through the plug N near its upper end and having its one end journaled in the wall of the tube B and its other end protruding through the slot H. Upon this shaft $p$ is mounted a sleeve $p'$, having square or other plain-sided ends. On the inner end of this sleeve is mounted the one tumbler $e$, while the other tumbler $d$ is mounted on the screw-threaded portion of the shaft $p$. These tumblers are held in position by means of the jam-nut $f'$. On the outer end of the sleeve $p'$ is mounted the graduated dial $C'$, by means of which the sleeve $p'$ is operated to rotate the tumbler $e$ and the graduations, on the face of which is a guide for the operator when moving the graduated knob K, that is rigidly mounted on the shaft $p$. This knob may be held in its position by means of a small nut $p^2$, mounted on the end of the shaft $p$.

The tumblers $e$ and $d$ are provided with a series of peripheral notches and one enlarged notch $g$. As the enlarged notches $g$ are brought into registry with each other the locking-bar which holds the stand locked is released and the tube may be raised or lowered at will. In the recess of the plug N is arranged a vertical locking-bolt $l'$, the end $h$ of which is adapted to engage in the enlarged notches $g$ when the bolt is released. This bolt is spring actuated and is forced upwardly by a spring $l$, arranged in the recess and loosely engaging an L-shaped bar $q$, having its one end connected to the bolt $l'$.

A spring-actuated bar $k$ is arranged in the plug and has its end protruding through openings in the wall of the tubes A and B, said bar $k$ being provided with a notch $j$ to receive the lower end of the bolt $l'$ and prevent the compression of the bar $k$ at any other time than when the notches $g$ in the tumblers are in registry with each other. A spring $m$ has its one end connected to the rear end of the bar $k$ and its other end coiled and connected to the lower end of the plug N by a screw $o$. On the outside of the tube A, surrounding the openings to receive the protruding end of the spring-pressed bar $k$, we provide bushings, in which is arranged plungers P, the ends thereof abutting against the end of the bar $k$ and by means of which when compressed the bar $k$ may be forced within the plug and the tube B released and lowered or raised in the tube A.

The stand is secured to the bicycle-frame by means of the clamps M M, as shown in Fig. 1, which may be of any desirable form of construction.

When the dials K and $C'$ are so turned that the character on the outer circumference of knob $K'$, which indicates the large notch $g$ in the wheel $d$, comes opposite to the character on the inner circumference of the dial $C'$, which indicates the large notch $g$ in wheel $e$, the vertical bar $l'$ is forced upwardly into these notches $g$ by action of the spring $l$, and being thus released from the bar $k$ this bar may be forced inwardly by the plunger P in the manner as hereinbefore referred to and the stand lowered to the supporting position. As the stand is lowered the bar $k$ when it reaches the bushing near the lower end of the tube A engages therein and holds the stand in the supporting position, but does not lock the same unless the tumblers are manipulated by their dials so as to destroy the combination. The tube A is provided at the lower end of the slot with a semidial $P'$ to be used by the operator as a guide for resetting the tumblers in case he locks the stand in the supporting position.

To change the combination, the nut $p^2$ may be removed from the end of the shaft and the indicating-dial K removed and replaced upon its shaft in a different position, so that a new character on the dial K will indicate the large slot $g$ in the tumbler $d$. To further change the combination, the dial $C'$ may be removed from its sleeve $p'$ at the time when knob $K'$ is removed from its shaft and in like manner replaced on its sleeve in a different position, so that a new character on this dial $C'$ will indicate the large notch $g$ in the tumbler $e$.

It will be observed that various changes may be made as may be desired, and these combinations may be made at will in the manner stated.

By the use of our improved stand the wheel may be supported at the will of the rider without the aid of a detached object, and therefore the stand is always available for instant use and when not in the lowered or supporting position is neatly folded on the wheel out of the way of the rider.

It will be noted that various changes may be made in the details of construction without departing from the general spirit of our invention.

Having fully described our invention, what we claim as new, and desire to secure by Letters Patent, is—

1. In a combination stand and lock for bicycles, the combination with an outer tube provided with a vertical slot, of an inner tube adapted to telescope within the outer tube, the said outer tube provided at its upper and lower end with an opening adapted to register with openings formed in the inner tube, a bushing surrounding the said openings of the outer tube, a socket rigidly secured within the lower end of said inner tube, a pair of supporting legs or brackets pivotally connected to the said socket and connected to said supporting legs or brackets for spreading the latter as the inner tube is withdrawn from the outer tube, operating means therefor, means arranged in the said inner tube adapted to engage in a pair of the said openings for locking the inner tube in a lowered or telescopic position, substantially as set forth.

2. In a combination stand and lock for bicycles, the combination with an outer tube provided with a vertical slot, of an inner tube adapted to telescope within the outer tube, the said outer tube provided at its upper and lower end with an opening adapted to register with openings formed in the inner tube, a bushing surrounding the said openings in the outer tube, a socket rigidly secured within the inner tube at its lower end, a pair of supporting legs or brackets pivotally connected to the said socket, a pair of spring-rods connected to the said legs or brackets for spreading the same, operating means therefor arranged in the said socket, means arranged in the said inner tube adapted to engage in a pair of the said openings for locking the inner tube in the desired position, and a plunger mounted in the said bushing adapted to engage the said locking means for releasing the same, substantially as described.

3. In a combination stand and lock for bicycles, the combination with an outer tube provided with a vertical slot, of an inner tube adapted to telescope within the outer tube, the said outer tube provided at its upper and lower end with an opening adapted to register with openings formed in the inner tube, a bushing surrounding the said openings in the outer tube, a socket rigidly secured within the inner tube at its lower end, a pair of supporting legs or brackets pivotally connected to the said socket, a pair of spring-rods connected to the said legs or brackets for spreading the same, operating means therefor arranged in the said socket, means arranged in the said inner tube adapted to engage in a pair of the said openings for locking the inner tube in the desired position, and means arranged in the said inner tube for locking the means engaging the openings in position, substantially as set forth.

4. In a combination stand and lock for bicycles, the combination with an outer tube provided with a vertical slot, of an inner tube adapted to telescope within the outer tube, the said outer tube provided at its upper and lower end with an opening adapted to register with openings formed in the inner tube, a bushing surrounding the said openings in the outer tube, a socket rigidly secured within the inner tube at its lower end, a pair of supporting legs or brackets pivotally connected to the said socket, a pair of spring-rods connected to the said legs or brackets for spreading the same, a spring-actuated plunger arranged in the said socket adapted to operate the spring-rods, means arranged on the said socket for limiting the movement of the said legs or brackets, means arranged in the said inner tube adapted to engage in a pair of the said openings for locking the inner tube in the desired position, and means arranged in the said bushing when operated adapted to release the inner tube, substantially as set forth.

5. In a combination stand and lock for bicycles, the combination with an outer tube provided with a vertical slot, of an inner tube adapted to telescope within the outer tube, the said outer tube provided at its upper and lower end with an opening adapted to register with openings formed in the inner tube, a bushing surrounding the said openings in the outer tube, a socket rigidly secured within the inner tube at its lower end, a pair of supporting legs or brackets pivotally connected to the said socket, a pair of spring-rods connected to the said legs or brackets for spreading the same, a spring-actuated plunger arranged in the said socket adapted to operate the spring-rods, means arranged on the said socket for limiting the movement of the said legs or brackets, a spring-actuated bar arranged in the said inner tube adapted to engage in a pair of the said openings for locking the inner tube in the desired position, and a permutation-lock arranged in the said tube for locking the said bar, substantially as set forth.

In testimony that we claim the foregoing invention as our own we have hereto affixed our signatures in the presence of two witnesses.

AGNESS AMESS.
MAUDE A. POWLISON.

Witnesses:
J. S. BEATTY,
M. L. LAIRD.